United States Patent
Noonan et al.

(10) Patent No.: US 10,367,599 B1
(45) Date of Patent: Jul. 30, 2019

(54) SYSTEMS AND METHODS FOR CONTROLLING WIRELESS COMMUNICATION DEVICES

(71) Applicant: Binj Laboratories, Inc., Scituite, MA (US)

(72) Inventors: Joseph S. Noonan, Scituate, MA (US); Barry Nadler, Largo, FL (US); Jules R. Insler, Bergenfield, NJ (US)

(73) Assignee: BINJ Laboratories, Inc., Scituate, MA (US)

( * ) Notice: Subject to any disclaimer, the term of this patent is extended or adjusted under 35 U.S.C. 154(b) by 0 days.

(21) Appl. No.: 15/206,260

(22) Filed: Jul. 9, 2016

Related U.S. Application Data

(63) Continuation of application No. 13/603,477, filed on Sep. 5, 2012, now Pat. No. 9,609,500, which is a continuation of application No. 13/323,817, filed on Dec. 12, 2011, now Pat. No. 8,996,029, which is a continuation of application No. 12/983,294, filed on Jan. 1, 2011, now Pat. No. 8,989,766, which is a continuation of application No. 12/510,006, filed on Jul. 27, 2009, now Pat. No. 8,996,028, which is a continuation of application No. 11/457,786, filed on Jul. 14, 2006, now Pat. No. 8,078,190.

(60) Provisional application No. 60/699,281, filed on Jul. 14, 2005, provisional application No. 60/739,877, filed on Nov. 23, 2005.

(51) Int. Cl.
*H04W 24/00* (2009.01)
*H04K 3/00* (2006.01)
*H04W 4/021* (2018.01)
*H04W 8/00* (2009.01)
*H04W 48/04* (2009.01)
*H04W 68/00* (2009.01)

(52) U.S. Cl.
CPC ............. *H04K 3/42* (2013.01); *H04W 4/021* (2013.01); *H04W 8/005* (2013.01); *H04W 48/04* (2013.01); *H04W 68/005* (2013.01)

(58) Field of Classification Search
CPC ..................................................... H04W 4/021
See application file for complete search history.

(56) References Cited

U.S. PATENT DOCUMENTS

| | | |
|---|---|---|
| 4,054,754 A | 10/1977 | Nicodemus |
| 4,638,496 A | 1/1987 | Jensen |
| 5,440,758 A | 8/1995 | Grube |
| 5,613,205 A | 3/1997 | Dufour |
| 5,966,655 A | 10/1999 | Hardouin |
| 6,031,490 A | 2/2000 | Forssen |
| 6,205,189 B1 | 3/2001 | Ha |
| 6,222,458 B1 | 4/2001 | Harris |

(Continued)

*Primary Examiner* — Justin Y Lee
(74) *Attorney, Agent, or Firm* — Law Office of Carl Giordano, PC.

(57) ABSTRACT

A method of detecting a transmitting device within an obstruction rich environment is disclosed. The method may involve detecting the transmitting device with a wireless transmission detection facility; communicating signal information relating to the detected transmitting device from the wireless transmission detection facility to a central unit; determining the location of the transmitting device; displaying information of the detection and location of the transmitting device through a user interface; and providing an action facility for causing actions related to the detected transmitting device.

24 Claims, 14 Drawing Sheets

(56) References Cited

U.S. PATENT DOCUMENTS

| | | | |
|---|---|---|---|
| 6,343,212 B1 | 1/2002 | Weber | |
| 6,490,455 B1 | 12/2002 | Park | |
| 6,580,372 B1 | 6/2003 | Harris | |
| 6,687,506 B1 | 2/2004 | Girod | |
| 6,765,492 B2 | 7/2004 | Harris | |
| 6,907,254 B1 * | 6/2005 | Westfield | H04W 48/04 455/404.2 |
| 7,046,990 B2 | 5/2006 | Grego | |
| 7,110,774 B1 | 9/2006 | Davis | |
| 7,202,798 B2 | 4/2007 | Harris | |
| 2001/0036821 A1 * | 11/2001 | Gainsboro | H04M 3/2281 455/410 |
| 2002/0011119 A1 | 1/2002 | Bignell | |
| 2002/0080954 A1 | 6/2002 | Felder | |
| 2002/0087062 A1 | 7/2002 | Schmit | |
| 2002/0098850 A1 | 7/2002 | Akhteruzzaman | |
| 2003/0083113 A1 * | 5/2003 | Chua | H04M 1/6083 455/569.2 |
| 2003/0206112 A1 | 11/2003 | Harris | |
| 2004/0009778 A1 * | 1/2004 | Makuta | H04L 63/107 455/456.1 |
| 2004/0033805 A1 | 2/2004 | Verma | |
| 2004/0043774 A1 | 3/2004 | Lee | |
| 2004/0113755 A1 | 6/2004 | Ricci | |
| 2004/0198346 A1 | 10/2004 | Swensen | |
| 2004/0203857 A1 | 10/2004 | Wang | |
| 2004/0246139 A1 | 12/2004 | Harris | |
| 2005/0046608 A1 | 3/2005 | Schantzq | |
| 2006/0099968 A1 | 5/2006 | Harris | |
| 2006/0105758 A1 | 5/2006 | Maislos | |
| 2006/0111062 A1 | 5/2006 | Cunningham | |
| 2006/0132307 A1 | 6/2006 | Velhai | |
| 2006/0160545 A1 | 7/2006 | Goren | |
| 2006/0192709 A1 | 7/2006 | Schantz | |
| 2010/0159877 A1 | 6/2010 | Slakini | |
| 2010/0159879 A1 | 6/2010 | Slakini | |
| 2010/0176918 A1 | 7/2010 | Turner | |

* cited by examiner

SYSTEMS AND METHODS FOR CONTROLLING WIRELESS COMMUNICATION DEVICES

CLAIM OF PRIORITY

This application claims the benefit of the earlier filing date, pursuant to 35 USC § 120, as a Continuation of that patent application entitled "Systems and Methods for Detection of Transmission Facilities," filed in the United States Patent and Trademark Office on Jul. 27, 2009 and afforded Ser. No. 12/510,006, which claims the benefit as a continuation of that patent application entitled "Systems and Methods for Detection of Transmission Facilities," filed in the United States Patent and Trademark Office on Jul. 14, 2006 and afforded Ser. No. 11/457,786, which claims the benefit of the filing dates, pursuant to 35 USC 119, to U.S. Provisional App. No. 60/699,281 filed on Jul. 14, 2005 and U.S. Provisional App. No. 60/739,877 filed on Nov. 23, 2005. This application is further claims the benefit of the earlier filing date, pursuant to 35 USC 119, to that provisional patent application, entitled "System and Method of Detection of Transmission Facilities", "filed in the United States Patent and Trademark Office on Jun. 19, 2010 and afforded Ser. No. 61/356,556. The entire content of these applications being incorporated by reference, herein.

BACKGROUND

1. Field of the Invention

This invention relates to location of transmission facilities and more particularly to the location of transmission facilities, such as cellular phones, in correctional institutions and controlling their use.

2. Background

There are many facilities, such as government buildings, and in particular correctional facilities, such as prisons, that do not permit cellular phone usage on the premises or even possession of cell phones in the premises. Finding and preventing usage of cell phones and other transmission facilities is difficult, and a need exists for improved methods of locating such devices, as well as a need for detecting such devices upon ingress to a facility.

SUMMARY

Provided herein are methods and systems for locating transmission facilities such as cell phones, mobile phones, satellite phones, radios, transmitters, PDAs, beepers, pagers, walkie-talkies, email devices, instant messenger devices, voice over IP devices, and other types of wireless communication or transmission facilities, and when necessary controlling such transmission facilities.

Embodiments relate to locating and managing the use and presence of wireless communication facilities. Embodiments relate to detecting such devices when they transmit a signal. Other embodiments relate to detecting non-active transmission facilities.

In certain embodiments the methods and systems disclosed herein include methods and systems for detecting a transmitting device within an obstruction rich environment. The methods and systems may include detecting the transmitting device with a wireless transmission detection facility; communicating signal information relating to the detected transmitting device from the wireless transmission detection facility to a central unit; determining the location of the transmitting device; displaying information of the detection and location of the transmitting device through a user interface; and providing an action facility for causing actions related to the detected transmitting device. In embodiments, the wireless transmission detection facility is an antenna. In embodiments, the antenna is a dual dipole embedded antenna. In embodiments, the dual dipole embedded antenna is tuned to receive cell phone transmissions. In embodiments the dual dipole embedded antenna is tuned to receive a frequency band of approximately 700 to 950 MHz. In embodiments the dual dipole embedded antenna is tuned to receive a frequency band of approximately 1.7 to 2.0 GHz. In embodiments the dual dipole antenna is tuned to receive signals in frequency bands of approximately 700 to 950 MHz and 1.7 to 2.0 GHz. In embodiments the obstruction rich environment is a correctional facility. In embodiments the obstruction rich environment is a mall. In embodiments communicating the information relating to the detected transmitting device from the wireless transmission detection facility to a central unit involves wireless communications. In embodiments the wireless communications are 802.11 communications. In embodiments determining the location of the transmitting device is accomplished through transmission triangulation. In embodiments location of the transmitting device is accomplished through a known location of a single antenna.

BRIEF DESCRIPTION OF FIGURES

The systems and methods described herein may be understood by reference to the following figures.

DETAILED DESCRIPTION OF FIGURES

Figure 1:
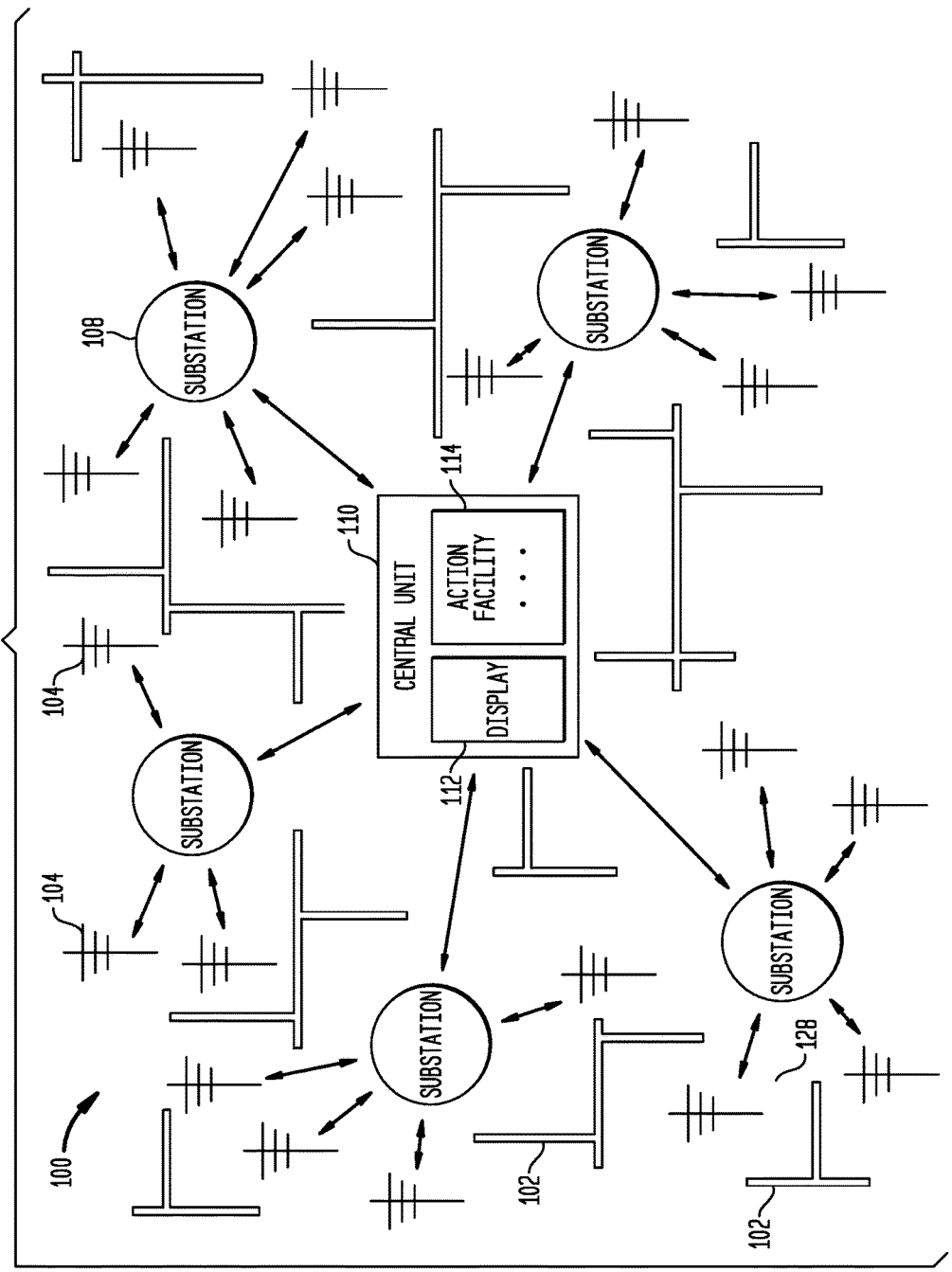
FIG. 1 shows a transmission detection, identification, and reporting system.
Figure 2:
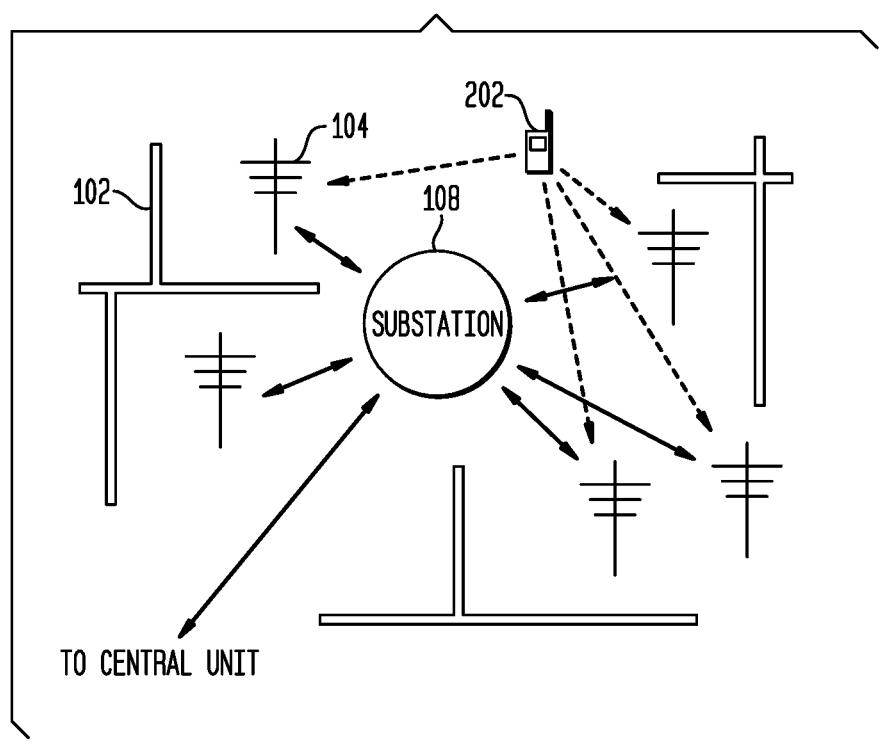
FIG. 2 illustrates a system for detecting a transmission facility

Detection of a transmission facility, such as a mobile phone or hand-held radio transmitter, or other transmission facility as described herein, within an obstruction rich environment, such as a facility with many physical barriers to electronic transmission, is difficult to achieve. Referring to FIG. 1, the transmission detection, identification, and reporting system 100 described herein provides a method of detecting a transmission facility 202, such as depicted in FIG. 2, within an environment rich in obstructions 102. One embodiment of the transmission detection, identification, and reporting system 100 may involve the detection of a mobile phone within a heavily walled and metal-barred government facility such as a correctional facility. In this embodiment, the system may utilize an array of antennas 104 selectively placed within the facility, collection substations 108 for localized collection of detected signals, a central unit 110 for the processing of incoming signals from the facility, a display 112 for showing the location of the detected transmission facility 202, and an action facility 114 for implementing standard procedures in the event of a detection. In this embodiment, the communications between the antennas 104 and the substations 108, and between the substations 108 and the central unit 110, may be wireless to make installation and maintenance of the system within the facility, cost and time effective. Selective placement of the antennas 104, combined with algorithms and methods for determining location of the transmission facility 202, may allow a substantially improved means for locating transmission facilities 202, such as mobile phones, in an otherwise heavily shielded environment.

Figure 3:
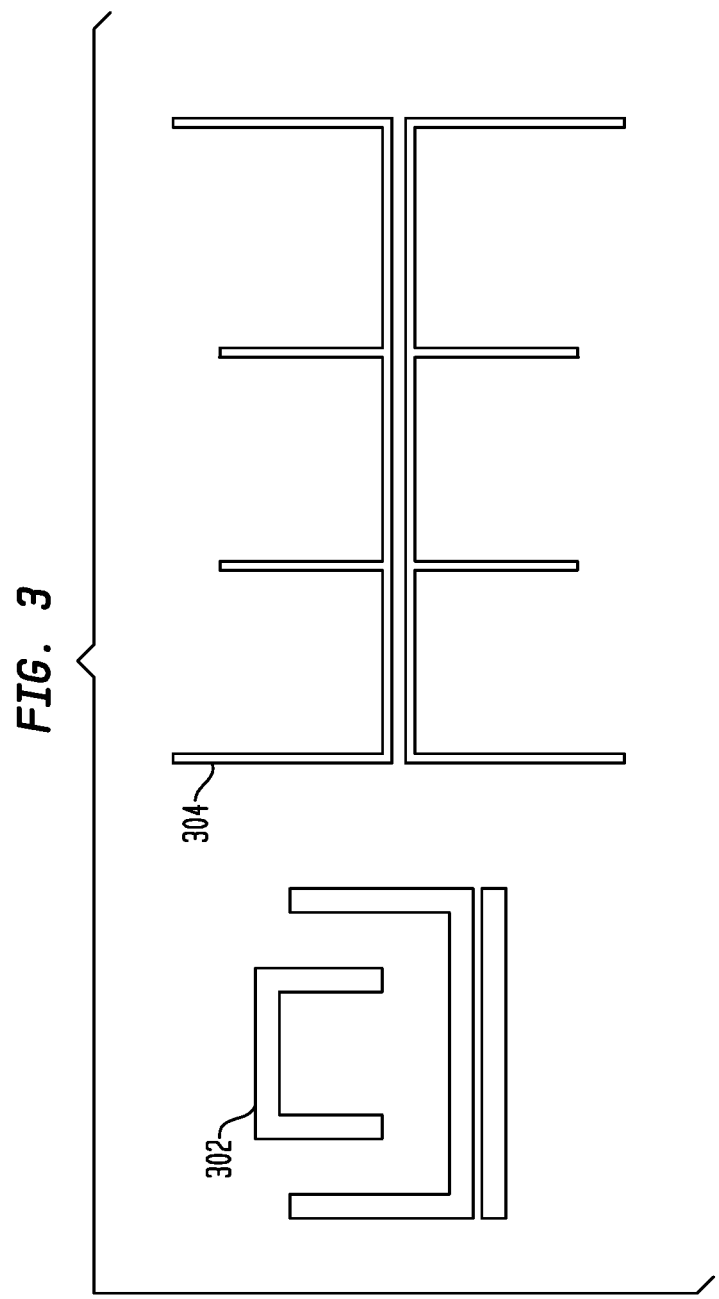
FIG. 3 illustrates antenna configurations.

In embodiments the antenna 104 may be a multi-dipole embedded antenna. Two examples of dual dipole embedded antennas are provided in FIG. 3 as a first dual-dipole embedded antenna 302 and a second dual dipole embedded antenna 304. In embodiments the antenna may be adapted to receive one, two, three, four, or more bandwidths. In embodiments the antenna 104 may be a dipole antenna 104, a Yagi-Uda antenna 104, a loop antenna 104, a quad antenna 104, a micro-strip antenna 104, a quad antenna 104, a helical antenna 104, a phase array antenna 104, a patch antenna or the like.

In embodiments, the transmission facility 202 may be a mobile phone, such as a flip phone, a slide phone, a cellular phone, a handset, a satellite phone, a 3G phone, a wireless phone, a cordless phone or the like. In embodiments, the transmission facility 202 may be a radio, such as a walkie-talkie, a mobile radio, a short-wave radio, or the like. In embodiments, the transmission facility 202 may be a wireless communication device like a laptop computer, a wireless modem, 802 transceivers technology and the like.

In embodiments, the transmission band from the transmission may be within the radio or other electromagnetic frequency spectrum, such as extremely low frequency (ELF), super low frequency (SLF), ultra low frequency (ULF), very low frequency (VLF), low frequency (LF), medium frequency (MF), high frequency (HF), very high frequency (VHF), ultra high frequency (UHF), super high frequency (SHF), extremely high frequency (EHF), microwave, a frequency suitable for 802.11x wireless communications, ultra wide band (UWB), Bluetooth, or the like.

In embodiments, the obstruction 102 rich environment may be a building, such as a corrections facility, a school, a government facility, a store, a mall, a residence, a hotel, a motel, or the like. In embodiments, the obstruction 102 rich environment may be a large confined space, such as a courtyard, a food court, a recess area, a hallway, greenhouse, recreation room, gymnasium, auditorium, kitchen, cafeteria, craft area, work area, library, prison yard, or the like. In embodiments, the obstruction 102 may be a transmission, device transmission obstruction 102, such as cinderblock, cement, rebar, wire cage, metal, metal coated surface, or the like. In embodiments, the obstruction 102 may be other construction materials, such as wood, glass, rug, flooring materials, roofing materials, and the like.

In embodiments, the transmitting signal information from the antenna 104 module to the central unit 110 may be through a communications connection, such as an IEEE 802.15.4 wireless network, IEEE 802.11 Wi-Fi, Bluetooth, Ethernet, or the and the like. In embodiments, the communications connection may utilize CAT-5, RJ-45, RS-232 connections, and the like. In embodiments the communications connection may utilize an optical connection, such as a wireless infrared link, an optical fiber, and the like.

In embodiments, the transmitting signal information from the antenna 104 module to the central unit 110 may contain data, such as CDMA, CDPD, GSM, TDMA, and the like, and may be used to discriminate which service signal is being used, such as Verizon, Cingular, T-Mobile, Sprint, and the like. The detection of the cell phones may be resolved down to cell phone manufacturer and cell phone provider.

In embodiments, the transmitting signal information to the central unit 110 may be made through an intermediate connection, such as a substation 108, router, switch, hub, bridge, multiplexer, modem, network card, network interface, processing unit, preprocessor, computer, repeater, antenna 104, and the like.

In embodiments, the central unit 110 may have in part a computer, a computer system, a network of computers, a state machine, a sequencer, a microprocessor, a digital signal processor, an audio processor, a preprocessor, a microprocessor, and the like.

In embodiments, the central unit 110 may process information, such as location information, such as the location of people, inmates, corrections personnel, visitors, all personnel within the facility, equipment, resources, weapons, products, incoming goods, outgoing goods, and the like. In embodiments, the information may be type of signal, such as mobile phone standard protocols such as CDMA, CDPA, GSM, TDMA, and the like. In embodiments, the information may be an event notification, such as personnel under duress, an emergency medical condition, a call for assistance, a fire, a call for police, a theft, and the like. In embodiments, the processed information may allow for the tracking of the person or object in possession of the transmission facility 202, such as a mobile phone, a radio, a weapon, a product, a resource, and the like. In embodiments, the processed information may allow for the discrimination and/or association between people or objects, such as determining the ownership of the transmission facility 202, the assignment of the source of transmission, current location of a transmission facility 202 compared to its predicted location, and the like. In embodiments, the processed information may also have time codes and unique identifiers assigned.

In embodiments, the central unit 110 may have a display 112, such as a cathode ray tube (CRT), liquid crystal display 112 (LCD), electronic paper, 3D display 112, head-mounted display 112, projector, segmented display 112, computer display 112, graphic output display 112, and the like. In embodiments, the central unit 110 may have an action facility 114, comprising a user interface for causing actions relating to the detected transmission facility 202, such as closing a door, sealing a room, deploying and action signal, initiating an alarm, and the like.

In embodiments the functions of a central unit 110 as described herein may be replaced by an alternate configuration, such as a configuration of multiple computers, such as a group of servers, processors, or the like, operating in parallel. In embodiments the methods and systems described herein may involve locating computing capabilities in alternative network configurations, such as in a mesh network or a peer-to-peer network.

In embodiments, the location of a transmission facility 202 may be determined by various radiolocation or signal measurement techniques, including measuring phase, amplitude, time, or a combination of these; or by identifying and locating an area associated with an antenna 104 with the highest signal strength. In embodiments, the location of a transmission facility 202 may be determined when the transmission facility 202 is powered off though detection of a null in the band pass of a transmitted frequency sweep due to the presence of a mobile phone antenna.

In embodiments, a method of detecting a transmission facility 202 (e.g. cell phone) when the transmission facility 202 is not powered may require a transmitting device and a receiving device that can recognize the signature of an antenna 104 associated with the transmission facility 202. By transmitting a known frequency and receiving the disturbance pattern produced by having a particular antenna 104 design in the transmission path, the pattern or 'signature' of that antenna 104 can be characterized. In embodiments, this characterization may be evaluated with a microprocessor 1402 with results output to a display 112. A database of these signatures can be placed into the device, and as the transmitter sweeps across the various cell frequencies, a pattern received can be matched against the database patterns to determine the presence of transmission facilities 202. In embodiments, any class of antenna (e.g. WI-FI, Blackberry, Walkie-Talkie, etc.) can be classified and identified.

In embodiments, the range of a hand held device that can detect an inactive transmission facility is approximately 10 feet. In embodiments, greater distances could be attained for stationary units by increasing the power.

Radiolocation, also referred to as radio-determination, as used herein encompasses any process of finding the location of a transmitter by means of the propagation properties of waves. The angle, at which a signal is received, as well as the time it takes to propagate, may both contribute to the determination of the location of the transmission facility 202. There are a variety of methods that may be employed in the determination of the location of a transmission facility 202. Methods include (i) a cell-sector system that collects information pertaining to cell and sector ID's, (ii) the assisted-global positioning satellite (GPS) technology utilizing a GPS chipset in a mobile communication facility, (iii) standard GPS technology, (iv) enhanced-observed time difference technology utilizing software residing on a server that uses signal transmission of time differences received by geographically dispersed radio receivers to pinpoint a user's location, (v) time difference of arrival, (vi) time of arrival, (vii) angle of arrival, (viii) triangulation of cellular signals, (ix) location based on proximity to known locations (including locations of other radio-transmitters), (x) map-based location, or any combination of any of the foregoing, as well as other location facilities known to those of skill in the art.

Obstructions 102 to radio wave propagation may greatly reduce the effectiveness of many of the conventional radiolocation methods due to obstruction of the line-of-sight between the transmission facilities 202 and the receiving antennas 104. However, by employing a large array of antennas 104, positioned so as to maintain line-of-sight between possible transmission facility 202 locations and the receiving antennas 104, several of these methods may be effectively used in the location of the transmission facility 202. These methods include time difference of arrival, time of arrival, and angle of arrival, amplitude comparison, and the like. The time difference of arrival method determines the difference in the time, or the difference in phase, of the same radio-transmitting signal arriving at different receiving antennas 104. Together with the known propagation speed of the radio wave, allows the determination of the location of the transmission facility 202. The time of arrival method determines the absolute time of reception of the signal at different receiving antennas 104, and again, along with the known propagation speed of the radio wave, allows the determination of the location of the transmission facility 202. The angle of arrival method utilizes direction of transmission to different antennas 104 to determine the location of the transmission facility. Amplitude comparison method compares the strength of the signal detected at each antenna to determine the location of a transmission facility 202. For example, two antennas 104 located in the same room would detect different signal amplitudes for the same transmission facility 202 output, thereby providing a means of determining which antenna 104 the transmission facility 202 is closer to. Increasing the number of antennas 104 therefore increases the resolution with which the location of the transmission facility 202 may be determined. All of these methods, and combinations of these methods, may employ mathematical processes such as triangulation, trilateration, multilateration, or like, in determining the location of the transmission facility.

Triangulation is the process of finding coordinates and distance to a point by calculating the length of one side of a triangle, given measurements of angles and/or sides of the triangle formed by that point, such as the target transmission facility 202, and two other known reference points, such as the receiving antennas 104. The calculation of the location of the transmission facility 202 may then be performed utilizing the law of sines from trigonometry. Tri-lateration is a method similar to triangulation, but unlike triangulation, which uses angle measurements, together with at least one known distance, to calculate the subject's location, tri-lateration uses the known locations of two or more reference points and the measured distance to the subject, such as the transmission facility 202, and each reference point, such as the receiving antennas 104. Multi-lateration, or hyperbolic positioning, is similar to tri-lateration, but multi-lateration uses measurements of time difference of arrival, rather than time of arrival, to estimate location using the intersection of hyperboloids.

While several radiolocation and triangulation techniques have been described in connection with locating the transmitting device, it should be understood that one skilled in the art would appreciate that there are other location methodologies and such location methodologies are encompassed by the present invention. For example, in embodiments, the location of a single antenna may be known and the single antenna may detect a transmitting device. The location of the transmitting device may be estimated through its known proximity to the single antenna location. This may provide adequate location resolution for certain applications of the technology. Similarly, two or more antennas may be used and each of the antenna locations may be known. When each of the antennas receives a transmission, the corresponding signal strengths may be compared. The one with the highest signal strength may be determined as the one closest to the transmitting device so the corresponding antenna location may provide enough location resolution for certain applications.

In an embodiment of the transmission detection, identification, and reporting system 100, a corrections facility, with its substantial and inherent obstruction 102 rich environment, presents an ideal example of how the transmission detection, identification, and reporting system 100 may significantly increase the detection of transmission facilities 202 such as mobile phones, a significant challenge to authorities of the correction facilities. In this embodiment, the system maybe placed throughout the corrections facility for the purpose of alerting the corrections staff that cell phone activity is taking place, the location of the activity and the type, i.e., Nextel, T-Mobile, Verizon, and the like. The following technology may also allow for a standalone detection unit 408 or set of detection units 408 to detect cell phones in schools, buildings and other environments in which the facility's or area's provider does not wish the use of cell phones and is interested in the detection of cell phone use.

In an embodiment, the system may include an integrated antenna 104 and RF detector (together referred to as a detector unit 408), a substation 108, whose purpose may be to communicate with each detector unit 408 within its sector, and report activity to the central unit 110 which reports confirmed activity, type of cell phone, and location to the display 112 of the central unit 110. These detection units 408 may be used individually or in conjunction with each other and may triangulate detection within a specific area. The outside yard areas may be monitored by detection units 408, which may cover large areas, such as 25×25 foot sectors or 5×5 foot sectors, to localize the detection of a cell phone and track its position from one sector to any adjoining sector. That is, as the person moves with a phone, the changing position of that phone may be reported. If the phone moves inside the facility, tracking may continue as interior detection units 408 detect the phone.

In an embodiment, within these basic groups of detection units 408 may be various detection unit 408 types. Some detection unit 408s may be designed to be hard wired via RJ-45 connectors and CAT 5e cable, other detection units 408 may use 802.11b (WI-FI) wireless communications between detection units 408, and there may also be an Infra Red (IR) set of detection units 408 which utilize optical communications techniques. Each communications type may have a specific purpose within the corrections facility or other type of building and/or areas. Hard-wired units may be used when it is not possible to use either an optical unit or a WI-FL unit. Used when there are walls embedded with metal or where the distance and the obstructions 102 may preclude a wireless technique. WI-FL detection units 408 be used when it is effective to communicate in an area where there are obstructions 102 such as cement walls or cement with embedded rebar walls, facades, and the like. Optical detection units 408 may be used in areas where clear, line-of-site communications may be possible. Optical detection units 408 may operate over relatively long distances, such as 3,000 feet, while WI-FI detection units 408 may be limited to shorter distances, such as 250 feet.

In an embodiment, there may also be a hand-held detection units 408 to be used once a cell phone has been detected, and the corrections officer(s) or monitor are attempting to pinpoint the location. This detection unit 408 may be similar to the integrated antenna/detector unit of the main system. This detector unit 408 may output an audible alarm whose pitch changes as the signal becomes stronger or weaker.

In an embodiment, a second type of hand-held detector unit 408 may be used to detect a cell phone when it is either off or in a standby condition, also referred to as null detecting. Null detection may be used at an ingress or egress of a building or area as a way of detecting a communication device or device with an antenna. This technique may be used in areas where it is unpractical, unwanted or unwarranted to have x-ray machines or more intrusive detection systems. A null detection system may also be deployed in a handheld device so an inspector can move through an area attempting to detect a communication device. In embodiments, the null detection system may detect the presence of a transmission facility even when the transmission facility is not transmitting a signal. In embodiments, a hand held or mounted null detection device may be used in a correctional institution or other government facility. In embodiments, null detection may utilize a transmission-detection source, independent of the transmission source being detected, which is capable of sweeping across the frequency spectrum of interest and receiving its returning signal. The transmission source sweeps the spectrum of interest, searching for distortions in the returned field. Distortions in the spectrum may be due to the presence of an antenna of a transmission facility 202. Matching the distortion, also referred to as a null in the band pass, to characteristics of known antennas used with mobile phones may allow the detection and/or identification of the transmission facility 202. The unit may output an audible "beep" if it detects a null, allowing the officers to focus in on the location of the cell phone. The range of the hand-held detection units 408 may be, for example, 15 to 20 feet. This will allow cell phones that are in the immediate vicinity to be quickly detected. The null detection may be applicable for egress detection.

In an embodiment, a survey may be performed to determine optimal placement and the type and number of detection units 408 required. This will insure the minimum number of required detection units 408 to perform optimal detection. The team may provide a report detailing the layout determined to be optimized for the facility and may review this report with the facilities staff so that any required modifications to the plan may be incorporated before installation is begun.

In an embodiment, the initial coverage of a facility may be in the cell blocks 402 and/or pod areas. The same may be true for linear facilities. The survey may cover the entire facility, including open areas, such as courtyards, where required. But the most likely place for the initial install may be in the prison cellblocks 402, since that is where the highest probability of detection may take place.

Figure 4:
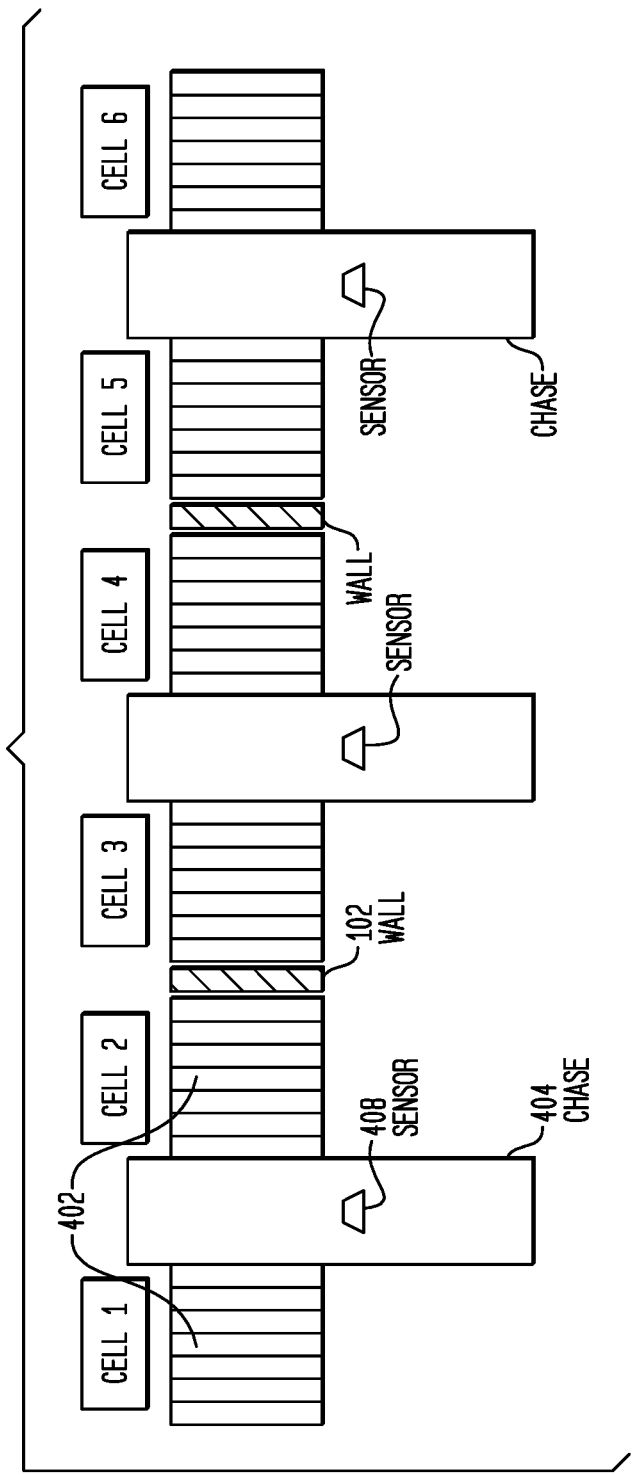
FIG. 4 illustrates a system for detecting a transmission facility in a cell environment.
Figure 5:
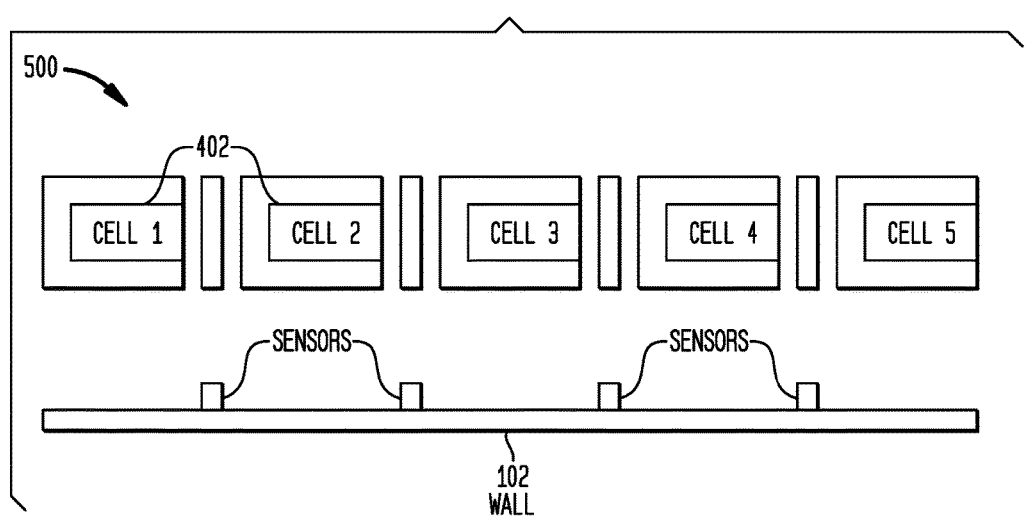
FIG. 5 shows a system for detecting a transmission facility in a cell environment.

In an embodiment, the cell block units may be mounted inside each chase 404 (a column positioned between cells in a cell block that includes various utility facilities, such as for plumbing and electricity), as shown in FIG. 4, and may communicate to a substation 108 located at one end of the block. This detection unit 408 may communicate its information to the central unit 110 so that tracking, confirmation, and display may be accomplished. For linear facilities 500, detector units 408 may be mounted along the walls 102, as shown in FIG. 5, opposite the cells 402 and perform their function similar to the detection units 408 mounted within a chase 404.

Figure 6:
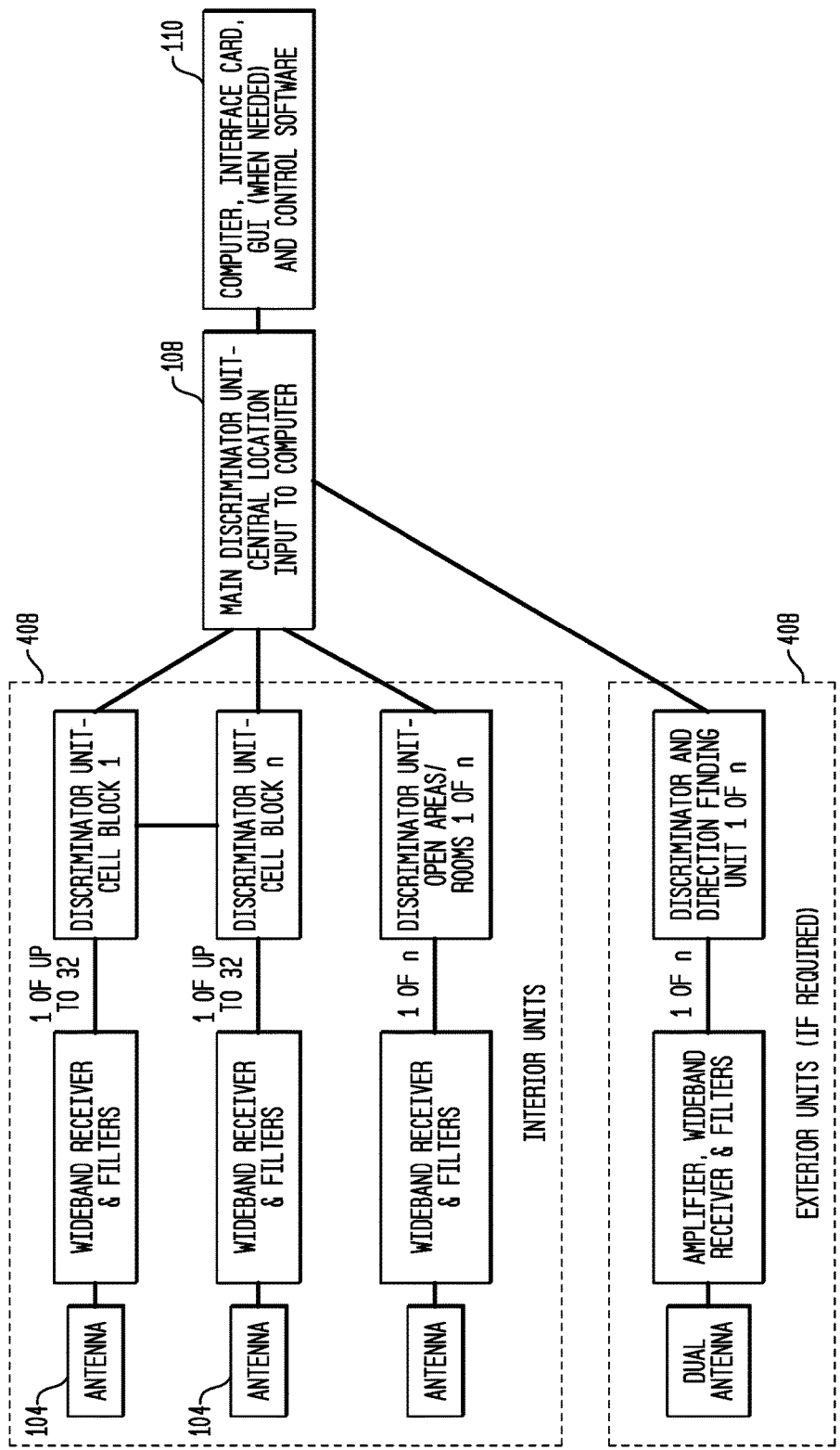
FIG. 6 illustrates a block diagram relating to actions taken when detecting transmission facilities.

In an embodiment, detector units 408 may be installed in open areas such as gymnasiums, kitchens, cafeterias, craft and work areas and other open areas where a cell phone may be used. The difference in these locations from the cell blocks 402 may include the method of detection and tracking. Since most facilities may only require the identification of a cell phones presence within a room, and there could be many inmates within that room, the process may be to lock-down the room, or rooms, in that area and use a hand held device and a physical search to pinpoint the phone location. A generalized block diagram is shown in FIG. 6. For those facilities that require resolving the location within a large interior room or area, the use of triangulation to resolve to a 10×10 foot area may be used.

Figure 7:
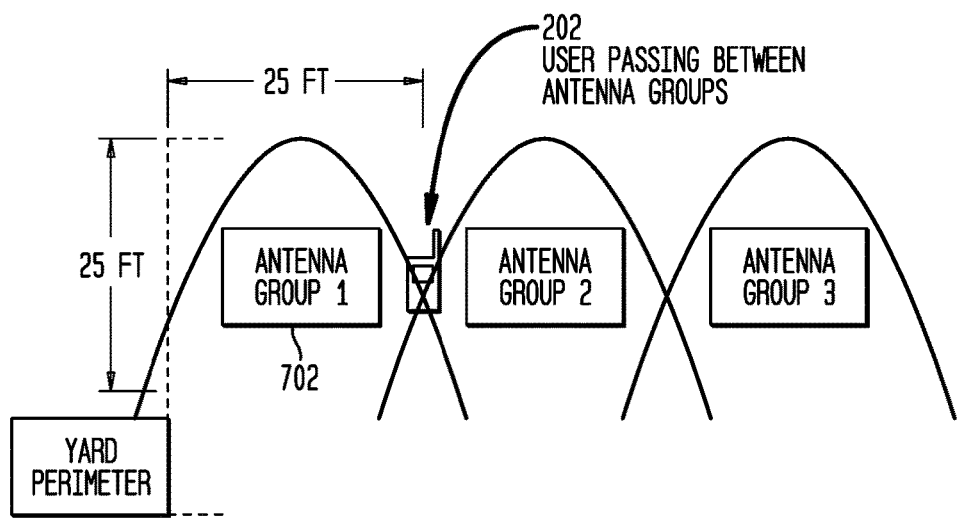
FIG. 7 shows a transmission facility detection system wherein an antenna array is used to calculate location.

In an embodiment, facilities with the requirement to detect cell phones 202 in outside yard areas, the use of triangulation to a 25×25 foot space or smaller foot space may be constructed. As a phone 202 is moved from area coverage 702 to area coverage 702, the system may track its movement. Each square foot sector may overlap an adjoining sector. In this way, as shown in FIG. 7, tracking may be continuous, without any gaps.

Figure 8:
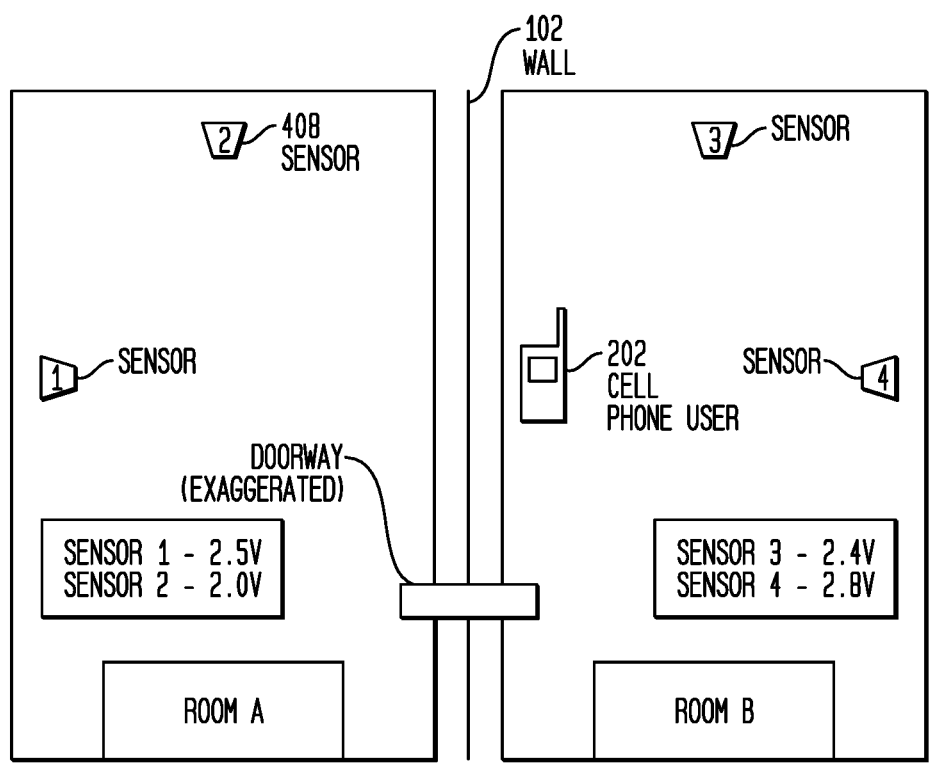
FIG. 8 shows a transmission facility detection system wherein a signal source is differentiated between two adjacent rooms.

In an embodiment, it may also important to know whether a phone is located on one side of an obstruction 102 or the other, such as doors, walls, and the like. If the wrong room is identified, it may make it more difficult to locate a phone and its user. As shown in FIG. 8, detection of the correct room may depend upon the level of the signal received. Proper placement of the detector units 408 may insure that the phone may be identified in the correct location.

Figure 9:
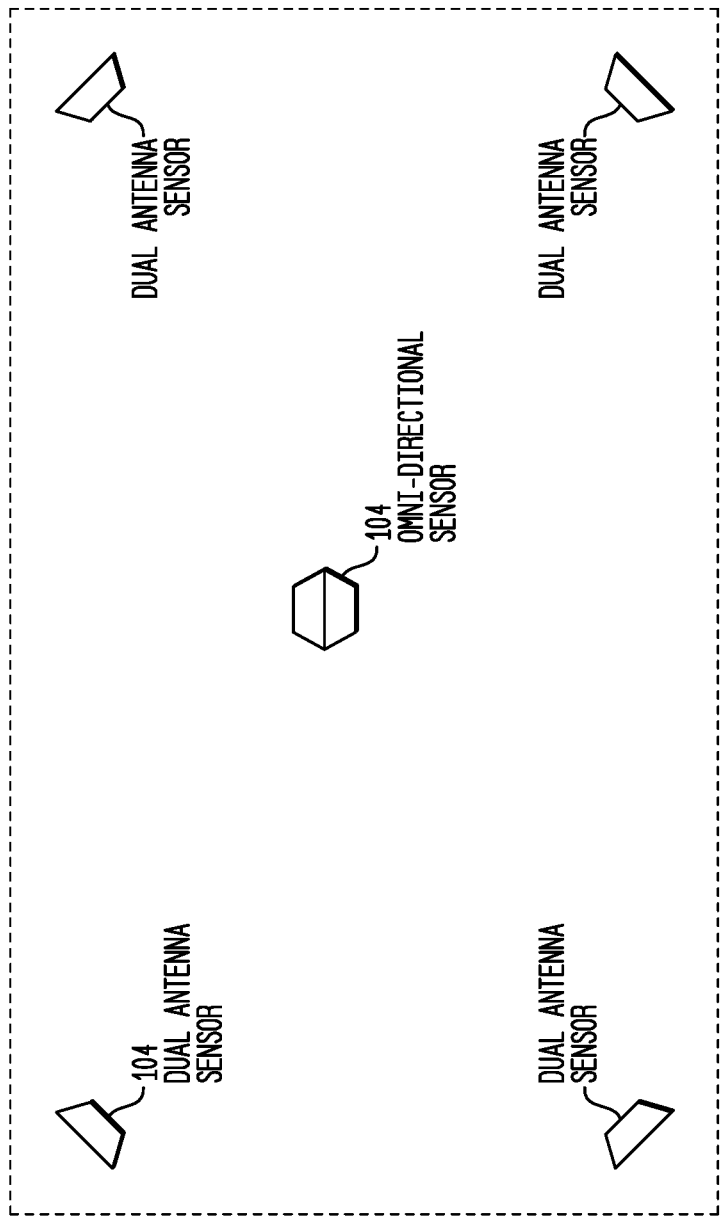
FIG. 9 illustrates a transmission facility detection system wherein multiple antennas are used to identify the location of a signal source after an omni-directional antenna has detected its presence.

In an embodiment, when sectoring a large room such as a gymnasium, the number and placement of antennas 104 may be critical. In order to sector large regions, such as a ten-by-ten ft section, within the room, the antenna 104 may need to be capable of narrowing their window to an area small enough to meet the requirement. In FIG. 9, there is an omni-directional antenna 104, which detects signal presence. Once a signal crosses a threshold, the direction finding antennas 104 may be turned on to determine the position of the signal. This may be reported to the display 112 and tracked until it is either turned off or moves to another room or hallway. Then, normal positional tracking may take place.

In an embodiment, the transmission detection, identification, and reporting system 100 may work in conjunction with a personal alarm system, This dual role system may allow for more cost effective use of the detection units 408 and provide for greater protection for the correctional officer. This detection system may utilize an individualized frequency, with known frequency separation between detection units 408. The detection configuration of the detection units 408 may provide complete coverage of the facility. Each unit may be continually tracked throughout the facility. At all ingress or egress points the focus of the detection may ensure accurate location of all correctional personnel. With the combined systems more detection units 408 may be need to ensure full coverage.

In an embodiment, the transmission detection, identification, and reporting system 100 may allow for cell phone (also referred to as transmission facility) owner discrimination. The system may provide for the allowance of authorized cell phones within the prohibited area. The system may detect and identify each cell phone or transmission facility and compare the cell phone (transmission facility) identity to the allowed transmission facility user list. The system may record all phone use and may automatically alert the facility of all prohibited cell phone or transmission facility use. In addition, each cell phone detection event may be identified with a unique identifier and time code, to ensure proper identification. This maybe accomplished by decoding the transmission facility. In an embodiment, the transmission detection, identification, and reporting system 100 the sensor unit determines the Time of Arrival (TOA), phone type, cell phone mode, amplitude, frequency, direction and phase of the transmission, the sensor unit also decodes the information within the transmission and extracts information to determine the cell phone identification.

Figure 10:
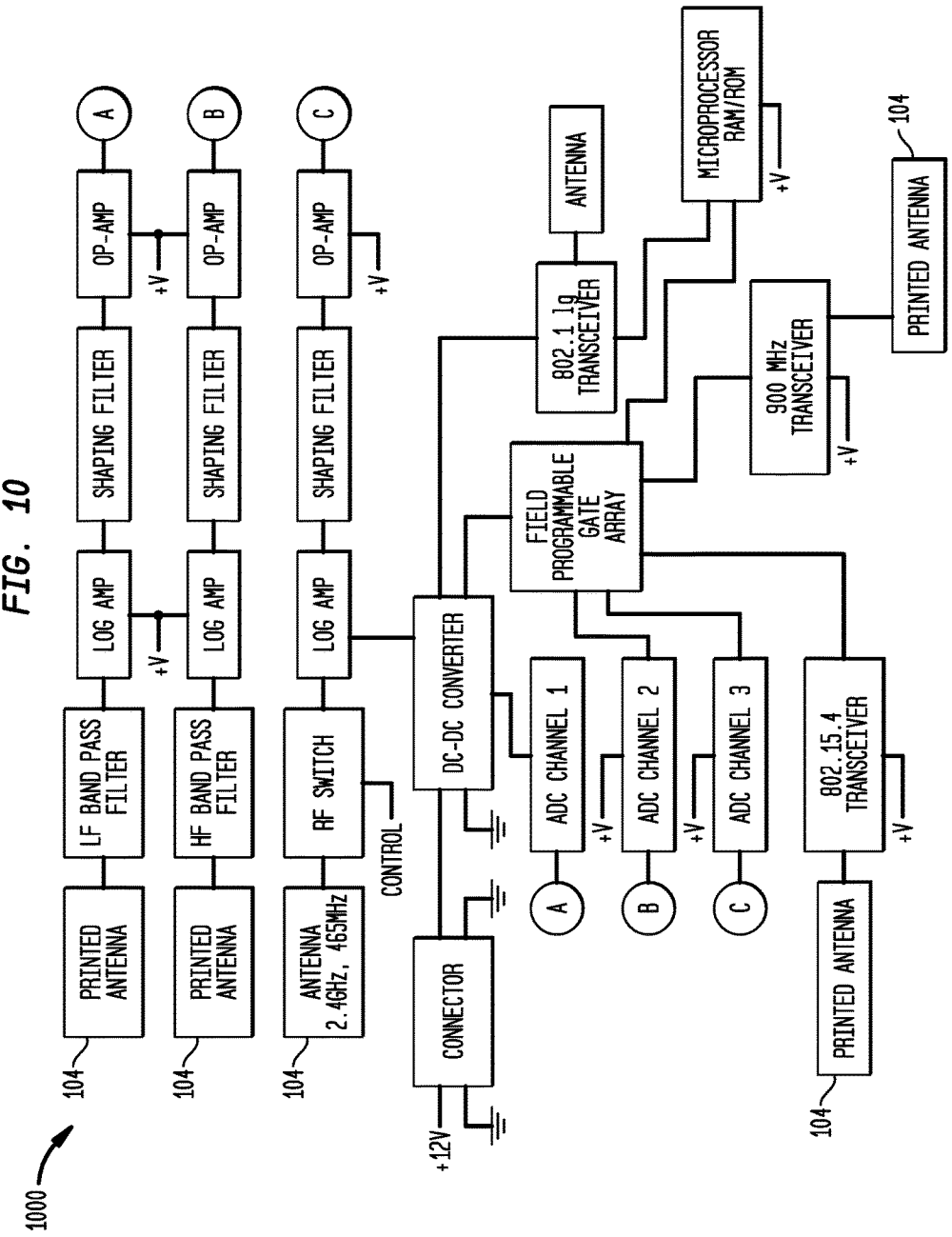
FIG. 10 shows a schematic diagram of a system for detecting signals of a transmission facility.

The cell scan-1 detection system 1000, shown in FIG. 10, is an embodiment of a system for detecting signals of a transmission facility. Antenna 104 receives transmission signals from wireless transmission device (not shown). Antenna 104 may operate, for example in the range of 2.4 GHz with a bandwidth of 465 MHz. The received signals are then provided to If the transmission facility for example is a person with a transmission facility (wristband) may allow or prevent them from accessing an area, it may also alert the central unit of their entering or desire to enter a restricted area. In an another embodiment, if the transmission facility for example were a cell phone and the cell phone was in use within a restricted area, the cell phone would be identified by the central unit as being in a restricted area, then the system will determine whether the cell phone is authorized or not authorized, then the system would make a determination, based upon set rules whether to allow or disallow the transmission unit.

Figure 11:
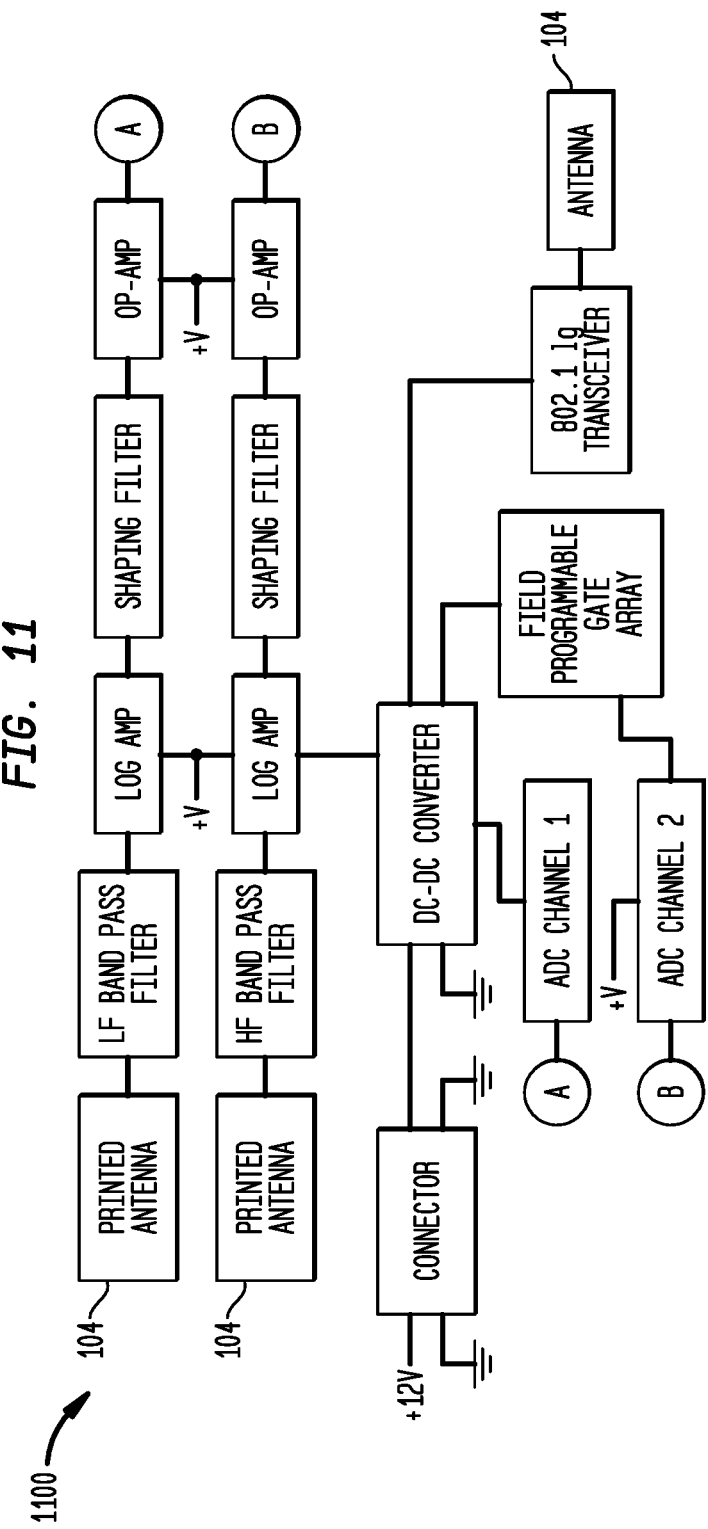
FIG. 11 shows a schematic diagram of an alternate embodiment of a system for detecting a signal of a transmission facility.

The cell scan-2 detection system 1100, shown in FIG. 11, shows an alternate embodiment of a system for detecting a signal of a transmission facility. For this embodiment the RF filters (i.e., band pass filter) isolate sets of frequency for greater sensitivity, in this example a Low band cell phone signals and high band cell phone signals. The operation of the elements of FIG. 11 is similar to that of FIG. 10 and need not be discussed in detail herein.

Figure 12:
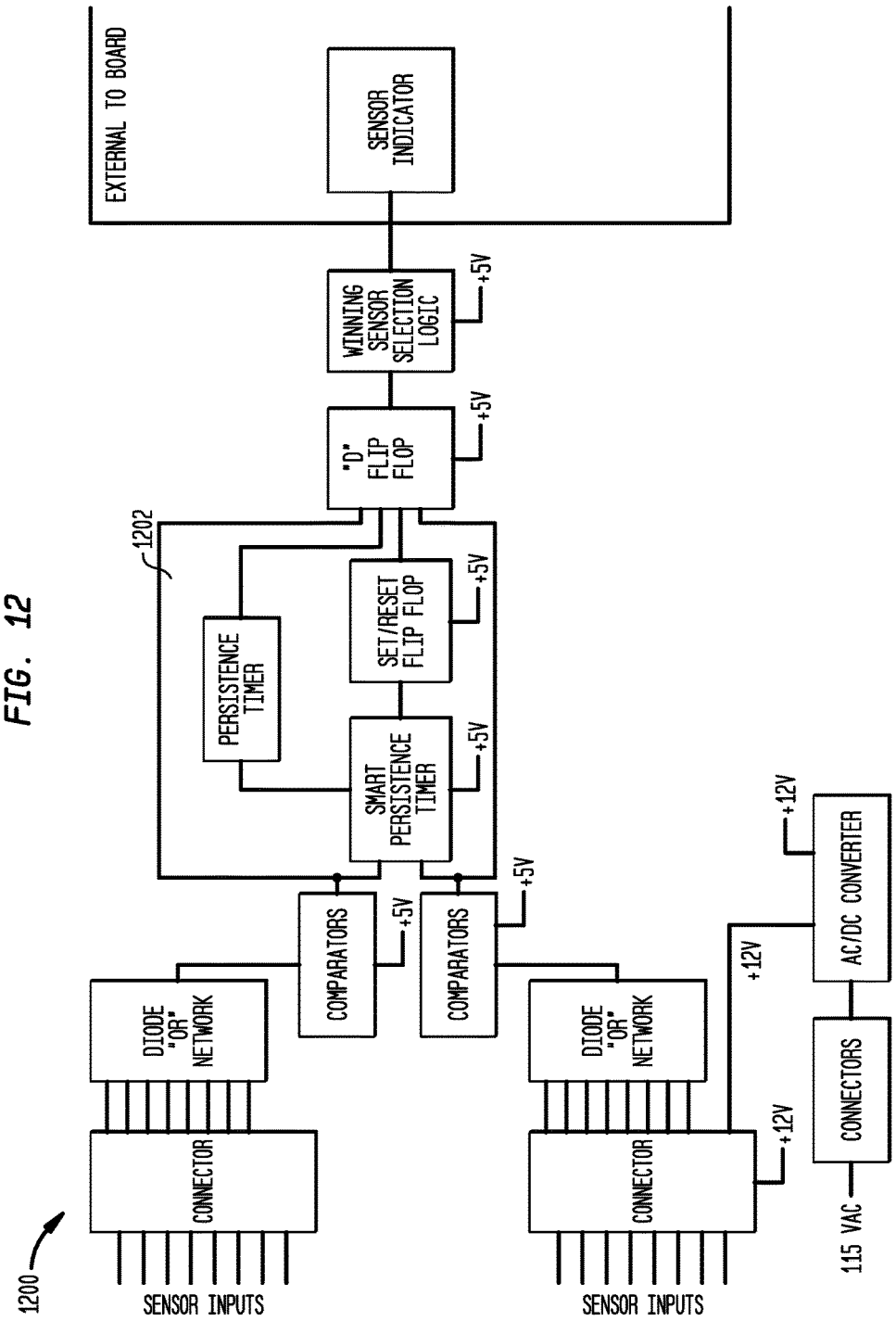
FIG. 12 shows a schematic diagram of a main circuit board within a system for detecting transmission facilities.

The main board system 1200, shown in FIG. 12, is an embodiment of a main circuit board within a system for detecting transmission facilities. The system may be used to determine each signal received is an actual cell phone signal and not a spurious output, a test may need to be performed that checks for the 'persistence' of the received signal. A persistence test may run a timer 1202 for a minimum required time that may be nearly as long as the time of the shortest signal type expected. If the signal is present at the end of the timeout period, it is less likely to be a spurious response and more likely that it is a cell phone output. For example, if a GSM signal of 500 microseconds long is the shortest duration signal of all the cell phone protocols received, the persistence test may run for 450 microseconds to further ensure that the received signal is not merely a spurious response.

Figure 13:
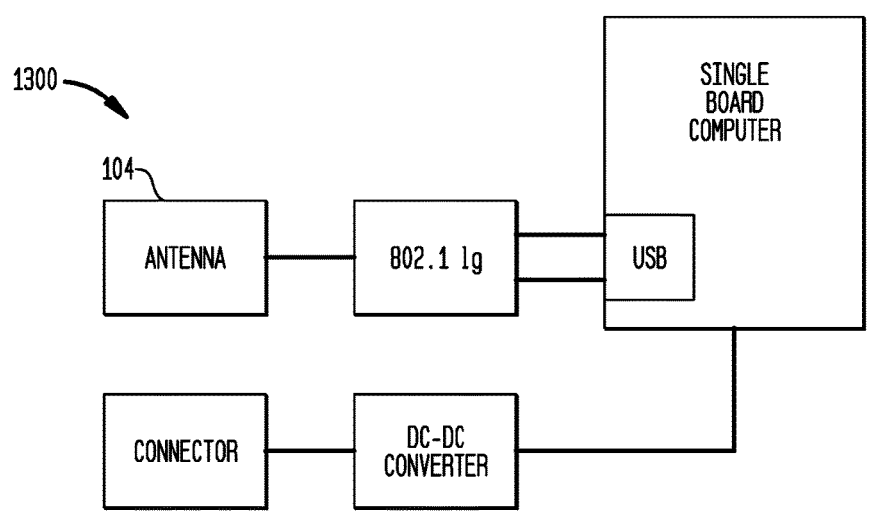
FIG. 13 shows a schematic diagram of a sub-station in a system for detecting transmission facilities.

The sub-station system 1300, shown in FIG. 13, is an embodiment of a sub-station in a system for detecting transmission facilities.

Figure 14:
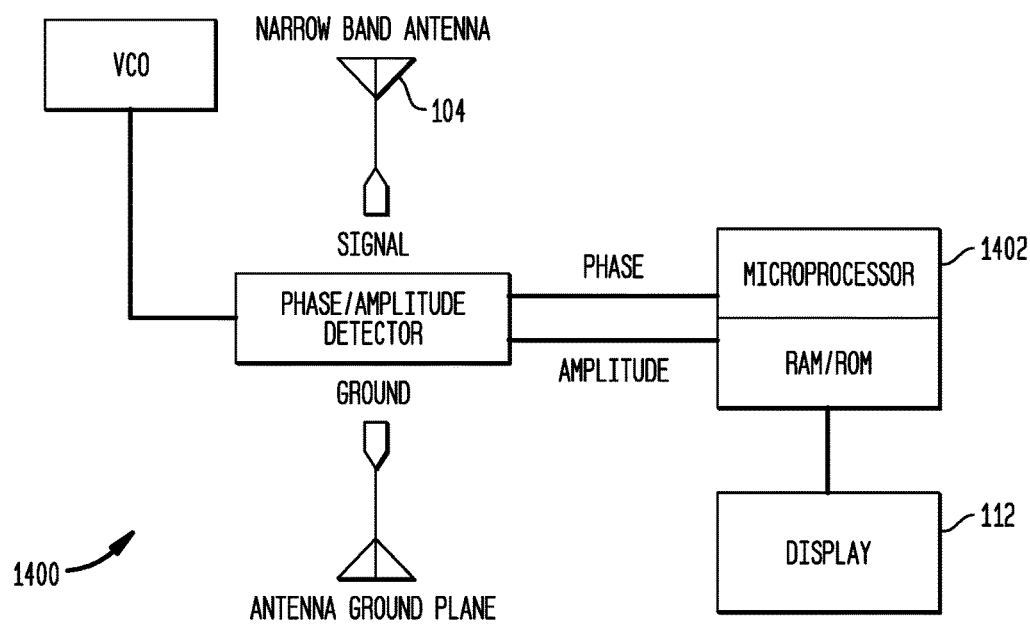
FIG. 14 illustrates a null detection facility.

FIG. 14 illustrates an embodiment of a null detector (1400), wherein the VCO in FIG. 14 tunes to known antenna frequencies and the system detects a null in the known antenna frequencies in which the antenna is detected. In embodiments, the null detection system may detect the presence of a transmission facility even when the transmission facility is not transmitting a signal. In embodiments, a hand held or mounted null detection device may be used in a correctional institution or other government facility. In embodiments, null detection may utilize a transmission-detection source, independent of the transmission source being detected, which is capable of sweeping across the frequency spectrum of interest and receiving it's returning signal. The transmission source sweeps the spectrum of interest, searching for distortions in the returned field. Distortions in the spectrum may be due to the presence of an antenna of a transmission facility 202.

In embodiments of the system described herein, detection levels may be determined by which output levels are possible with the various cell phone technologies that are in use today. Since the system described is an amplitude system, the strongest and weakest possible signals must be determined in order to identify the system's required dynamic range. Cell phone signals vary from −22 dBW to 6 DBW and this range defines the detection requirements of the system. This translates to a maximum signal of 4.0 Watts at the antenna. The minimum value is equal to 0.006 Watts or 6 milliwatts. Therefore, the dynamic range required is −52 dBm to +36 dBm. In order to achieve such a dynamic range, an amplifier that is gain adjustable is required such that an input value of +36 dBm, the amplifier is not saturated.

In the embodiment, the system determines the characteristics required to insure that each cell phone is correctly identified. The amplitude of each signal is determined which allows the system to determine which sensor has received the largest signal. The system time stamps each data sample so that other sensors receiving the same signal will be recognized as such when the data is presented for analysis. Each sensor analyzes the wave shape of the signal detected. Each transmission type (i.e., CDMA2000, PCS, TDMA, GSM, IS-95, etc.) has a unique wave shape. These wave shapes allow the analysis software to recognize that signals seen in different parts of a facility can be associated with each other (using time and wave shape) and the signal that consistently contains the largest amplitude will be identified as closest to the cell phone transmission In embodiments of the invention, signals directed toward an IED (improvised explosive device) may be intercepted, identified and denied service. Such interception may be up to a known range in forward and side quadrants. The identification and determination of the position of the person or persons using a satellite phone and/or land-based cell phone may be determined. Cell phones, as well as other RF devices, e.g., garage door openers, walkie-talkie, etc., may be captured, identified and/or jammed that are attempting to activate or contact the IED.

In embodiments of the invention, when a cell phone, for example, is on, but not in an active communication, the cell phone is essentially invisible to anyone attempting to monitor cell phone activity. In order to be aware of the existence of such "on but not transmitting devices" the system described herein operates as a cell tower. That is, the system actively addresses the problem of cell phone detection by operating (becoming) the tower. A vehicle with similar (but modified equipment to that of a cell tower may actively poll the area of phones that are "on but not in a communication of any sort." The vehicle (i.e., Pseudo Tower) collects the current database of active phones and those phones in standby from the tower(s) in the area and uses this data base to poll these phones in order to locate them. Once potential phones that could be possible detonation cell phones are identified and located, the Pseudo Tower would affect a handoff and make itself the active tower. Thus, the captured cell phones are not allowed to rotate back to (i.e., connect to) the local cell phone tower, insuring that any calls attempting to communicate with the detonation cell phone will not be sent. As one of the goals is to identify the person who is attempting to contact the detonation cell phone, a call history of each suspect cell phone may be analyzed.

When a caller attempts to activate an IED, the caller's presence can be identified. Furthermore, the call being made is not forwarded to the detonation cell phone and the IED will not be activated. By determining a peak angle (triangulation) the caller's cell phone/satellite phone signal, the direction of the caller is then known. Direction identification is performed by using a technique such an interferometry. In this case, multiple antennas employing interferometry may be used to scan through the current cell phone traffic identifying first, candidate threats and then, pinpointing high probability locations which can be viewed through a high powered binoculars to determine whether the candidate is in need of investigation. Criteria for determining which cell locations may be threats is a pole or road sign, etc. The Psuedo Tower may continue controlling all of the phones in the area, preventing any forwarding of calls until all possible threats have been cleared. At this point, the personnel have the option of going after the caller or deactivating the IED, or both. It would be possible to clear the area and detonate the device later if that is a desired plan of action.

Given the varying parameters by which detonation can take place, the Pseudo Tower may also be designed to deny service to any active and inactive phone within a given geographical area and pinpoint the location of said phones.

Satellite cell phone transmission presents a somewhat different problem. Since the transmission from phone to satellite to phone is communicated to a number of satellites, becoming a replacement for the satellite will require cooperation from the provider. Via one or more specific codes, the satellites may be told that the vehicle mounted satellite simulator (i.e., Pseudo Tower) will be taking over the control of phones within a certain radius. Since this is a moving or ever changing circle, the replacement "satellite" will have to continuously update the actual satellite of its position and which phones are being released and which phones are being controlled. Once this function has been implemented, the control of the suspect phones is similar to that of the cell phone. Determining the caller's position and the location of the detonation phone is as above.

Documents referenced herein are hereby incorporated in their entirety by reference. While the invention has been described in connection with certain preferred embodiments, other embodiments would be understood by one of ordinary skill in the art and are encompassed herein.

What is claimed is:

1. A transmission detection, identification, and reporting system for detecting wireless transmission usage within at least one of a plurality of predetermined zones, the system comprising:
   a plurality of wireless transmission detectors capable of detecting a wireless transmission signal associated with at least one of: a cellular communication and a non-cellular communication, wherein at least one of said plurality of wireless transmission detectors is operatively associated with at least one of said predetermined zones;
   an action system configured to:
      receive said detected wireless transmission signal from a corresponding one of the at least one of said plurality of wireless transmission detectors;
      extract from the detected wireless transmission signal identification information of a wireless device associated with the detected wireless transmission signal;
      determine from the detected wireless transmission signal a location of the wireless device associated with the detected wireless transmission signal;
      determine whether the wireless device associated with the detected wireless transmission signal is a suspect device, wherein the wireless device is deemed suspect based on the location of the wireless device associated with the detected wireless transmission signal being within one of the plurality of predetermined zones; and affect a handoff of the determined suspect wireless device, wherein the suspect wireless device is not allowed to operate within the predetermined zone;
generate one or more notifications regarding said suspect wireless device.

2. The transmission detection, identification, and reporting system as claimed in claim 1, wherein the action system is configured to:
process information associated with the location of the wireless device associated with the wireless transmission signal, wherein the wireless device is associated with at least one of: people, inmates, personnel, visitors, equipment, resources, weapons, products, incoming goods, and outgoing goods.

3. The transmission detection, identification, and reporting system as claimed in claim 1, wherein the wireless device associated with the wireless transmission signal is at least one of: a cell phone, a mobile phone, a satellite phone, a radio, a transmitter, WI-FI communication device, a laptop computer, a wireless modem, a cordless phone, an RF device, a garage door, a personal digital assistant (PDA), a beeper, a pager, a walkie-talkie, an email device, an instant messenger device, a voice over IP device, and a non-cellular device.

4. The transmission detection, identification, and reporting system as claimed in claim 1, wherein the notification comprises at least one of:
an identification of each detected wireless transmission signal within one of the plurality of predetermined zones, a date, a time of transmission detection, an event notification, a personnel under duress notification, an emergency medical condition notification, a call for assistance notification, a fire notification, a call for police notification, a theft notification, the location of the detected wireless transmission and a location information identifying the respective predetermined zone.

5. The transmission detection, identification, and reporting system as claimed in claim 1, wherein said location is determined based on a location of at least one of said plurality of wireless transmission detectors.

6. The transmission detection, identification, and reporting system as claimed in claim 1, wherein said location is determined based on at least one of: measuring a highest signal strength, measuring a phase, measuring a time, a cell-sector associated with the at least one said wireless transmission detectors, an assisted-global positioning satellite (GPS) technology, a standard GPS technology, an enhanced-observed time difference technology, a time difference of arrival, a time of arrival, an angle of arrival, a triangulation of signals from a plurality of wireless transmission detectors, a proximity to known locations, a proximity to other radio-transmitters, a map-based location, and a measuring of amplitude of the detected wireless transmission signal associated with corresponding wireless transmission detectors.

7. The transmission detection, identification, and reporting system as claimed in claim 1, wherein the one or more notifications is provided to personnel regarding operation of the wireless device.

8. The transmission detection, identification, and reporting system as claimed in claim 1, wherein said action system is configured to:
generate said one or more notifications in a format selected from a group comprising: an email message, a telephonic voice message, and an information record.

9. The transmission detection, identification and reporting system of as claimed in claim 1, wherein at least two of the plurality of wireless transmission detectors partially overlap within a same one of the plurality of predetermined zones.

10. The transmission detection, identification, and reporting system as claimed in claim 1, further comprising at least one of:
a display system, a cell tower, a jamming system, a satellite system, a Pseudo Tower, a closing a door system, a sealing a room system, a deploying and action signal system, an initiating an alarm system, a computer system, a network of computers, a state machine, a sequencer, a microprocessor, a digital signal processor, an audio processor, a preprocessor, a microprocessor, a database system, a discrimination system, and a decoding system.

11. The transmission detection, identification, and reporting system as claimed in claim 1, wherein the action system is configured to:
transmit a polling signal to at least one wireless device in a corresponding one of the at least one predetermined zone.

12. The transmission detection, identification, and reporting system as claimed in claim 1, wherein the action system is configured to:
receive information associated with at least one wireless device in a corresponding one of the at least one predetermined zone.

13. A management system for detecting and managing a wireless device usage, the system comprising:
a plurality of wireless transmission detectors, associated with a facility, the wireless transmission detectors configured to:
generate a detection signal upon detection of a wireless transmission;
an action facility coupled to said plurality of wireless transmission detectors, said action facility configured to:
receive said detection signal from corresponding ones of said plurality of wireless transmission detectors;
determine an identity of a wireless device associated with the detection signal;
determine whether the wireless device is a suspect device, wherein the wireless device is determined to be suspect based on a location of the wireless device;
initiate a handoff of said wireless device to the management system after determining said wireless device is a suspect device wherein the suspect wireless device is not allowed to operate within the facility; and
generate one or more notifications indicative of the detected wireless transmission.

14. The management system as claimed in claim 13, wherein the action facility comprises:
a user interface, said user interface communicating with at least one additional system.

15. The management system as claimed in claim 13, wherein the detected wireless transmission is associated with at least one of: a cell phone, a mobile phone, a satellite phone, a radio, a transmitter, a PDA, a beeper, a pager, a WI-FI communication device, a wireless communication device, a laptop computer, a wireless modem, a cordless phone, an RF device, a garage door, a walkie-talkie, an email device, an instant messenger device, a voice over IP device, and a non-cellular device.

16. The management system as claimed in claim 13, wherein said one or more notifications comprises at least one of:

an identification of each detected wireless transmission within one of the plurality of predetermined zones, a date, a time of transmission detection, an event notification, a personnel under duress notification, an emergency medical condition notification, a call for assistance notification, a fire notification, a call for police notification, a theft notification, the location of the detected wireless transmission and a location information identifying the respective predetermined zone.

17. The management system as claimed in claim 16, wherein said location information is based on data associated with a location of at least one of said plurality of said wireless transmission detectors.

18. The management system as claimed in claim 13, wherein said one or more notifications is generated in a format selected from a group consisting of: an email message, a telephonic voice message, and an information record.

19. The managing system as claimed in claim 13, the action system further configured to:
  generate an event notification in response to said detected wireless transmission being associated with an event.

20. The managing system as claimed in claim 19, wherein the event is selected from a group consisting of: a personnel under duress event, an emergency medical condition event, a call for assistance event, a fire event, a call for police event, and a theft event.

21. The managing system as claimed in claim 19, the action system further configured to:
  track said detected wireless transmission.

22. The managing system as claimed in claim 13, the action system further configured to:
  determine at least one of: ownership of said wireless device, an association between people of said wireless transmission, and an association between objects.

23. The managing system as claimed in claim 13, further comprising at least one of:
  a display system, a cell tower, a jamming system, a satellite system, a Pseudo Tower, a closing a door system, a sealing a room system, a deploying and action signal system, initiating an alarm system, a computer system, a network of computers, a state machine, a sequencer, a microprocessor, a digital signal processor, an audio processor, a preprocessor, a microprocessor, a database system, a discrimination system, and a decoding system.

24. The management system as claimed in claim 13, wherein the action system is configured to:
  process information associated with the location of the wireless device, wherein the wireless device is associated with at least one of: people, inmates, personnel, visitors, equipment, resources, weapons, products, incoming goods, and outgoing goods.

* * * * *